US008010802B2

(12) United States Patent
Kang et al.

(10) Patent No.: US 8,010,802 B2
(45) Date of Patent: Aug. 30, 2011

(54) CRYPTOGRAPHIC DEVICE HAVING SESSION MEMORY BUS

(75) Inventors: Sun Kang, Daejeon (KR); Soo Hyeon Kim, Daejeon (KR); Hyo Won Kim, Gyeonggi-do (KR); Tae Joo Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 643 days.

(21) Appl. No.: 12/119,539

(22) Filed: May 13, 2008

(65) Prior Publication Data

US 2009/0319800 A1 Dec. 24, 2009

(30) Foreign Application Priority Data

Dec. 7, 2007 (KR) ........................ 10-2007-0126551

(51) Int. Cl.
*G06F 21/00* (2006.01)
*H04L 9/00* (2006.01)
*H04K 1/00* (2006.01)

(52) U.S. Cl. ........................................ 713/189; 712/220

(58) Field of Classification Search .................. None
See application file for complete search history.

(56) References Cited

U.S. PATENT DOCUMENTS

| 4,278,837 | A | * | 7/1981 | Best ............................ 713/190 |
| 4,465,901 | A | * | 8/1984 | Best ............................ 713/190 |
| 6,115,816 | A | * | 9/2000 | Davis ............................ 713/153 |
| 6,813,654 | B1 | * | 11/2004 | Ishibashi ........................ 710/36 |
| 6,901,516 | B1 | * | 5/2005 | Howard et al. ............... 713/193 |
| 7,315,956 | B2 | * | 1/2008 | Jensen et al. ................... 713/500 |
| 7,636,858 | B2 | * | 12/2009 | Khan et al. ..................... 713/189 |
| 7,698,590 | B2 | * | 4/2010 | Jensen et al. ................... 713/500 |
| 2004/0193763 | A1 | * | 9/2004 | Iizuka et al. ..................... 710/52 |
| 2008/0077820 | A1 | * | 3/2008 | Jensen et al. ................... 713/500 |
| 2009/0177892 | A1 | * | 7/2009 | Steeves et al. ................ 713/185 |
| 2009/0290712 | A1 | * | 11/2009 | Henry et al. ................... 380/277 |

FOREIGN PATENT DOCUMENTS

| KR | 1020030054710 | | 7/2003 |
| KR | 1020030083100 | A | 10/2003 |
| KR | 1020050068776 | | 7/2005 |
| KR | 1020070061329 | | 6/2007 |

OTHER PUBLICATIONS

Tae Joo Chang; "Core technology for implementing a high-speed cryptographic processor", Korea Institutes of Information Security and Cryptology (KIISC) Review, vol. 16, No. 3, pp. 34-40, Jun. 2006.

* cited by examiner

*Primary Examiner* — Christopher Revak
(74) *Attorney, Agent, or Firm* — Ladas & Parry LLP

(57) ABSTRACT

Provided is a cryptographic device performing encryption or decryption on input data, and more particularly, a cryptographic device having a session memory bus for communicating with a session memory. The cryptographic device includes: an external session memory for storing cryptographic information on each session; a cryptographic processor for encrypting or decrypting input data using the cryptographic information; an external session memory bus connected to the external session memory and the cryptographic processor; and a Central Processing Unit (CPU) for transferring and receiving data to and from the external session memory via the cryptographic processor. The separate session memory buses allow the cryptographic processor to access a session memory without being disturbed by another device, thereby improving the entire performance of the cryptographic device.

13 Claims, 7 Drawing Sheets

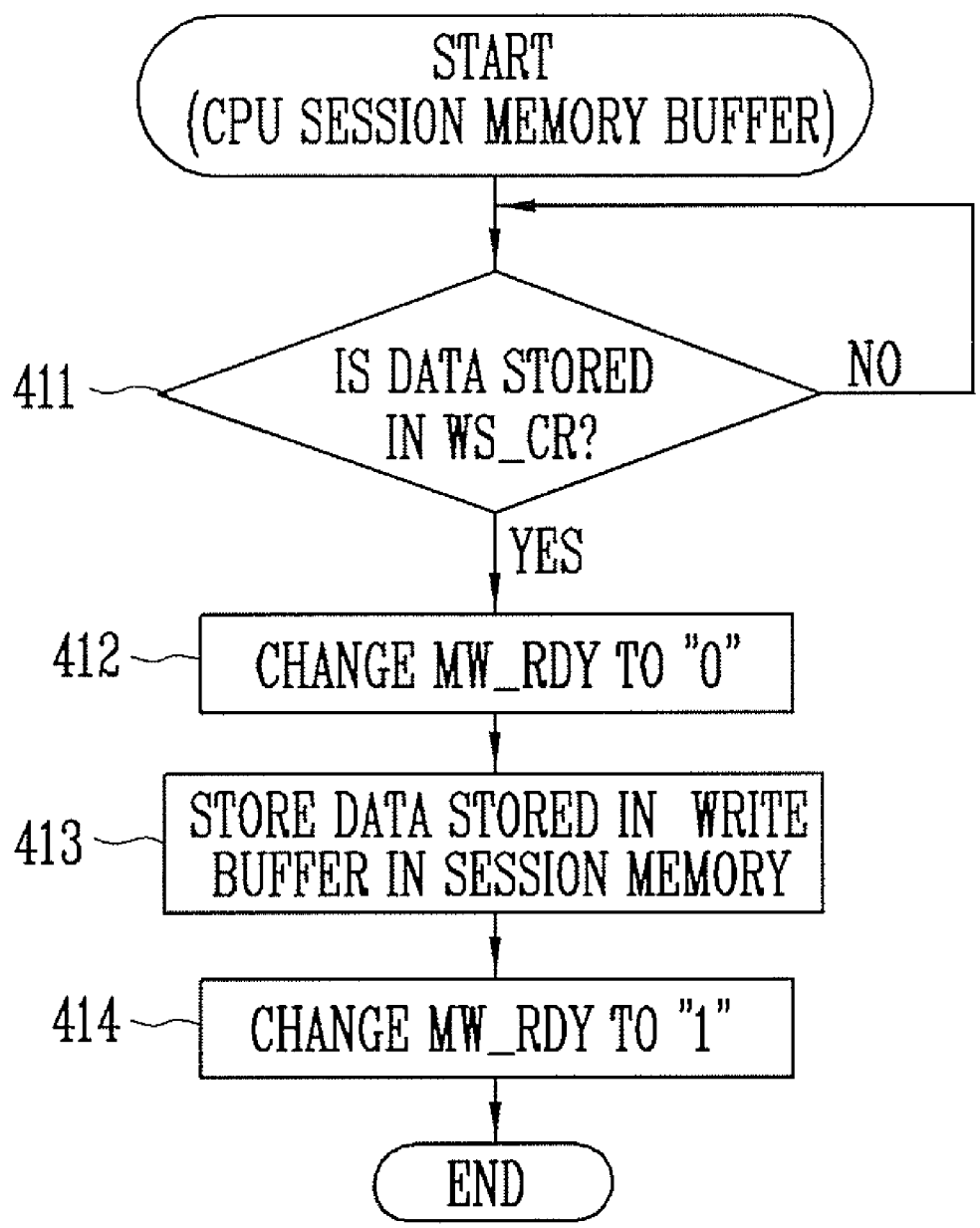

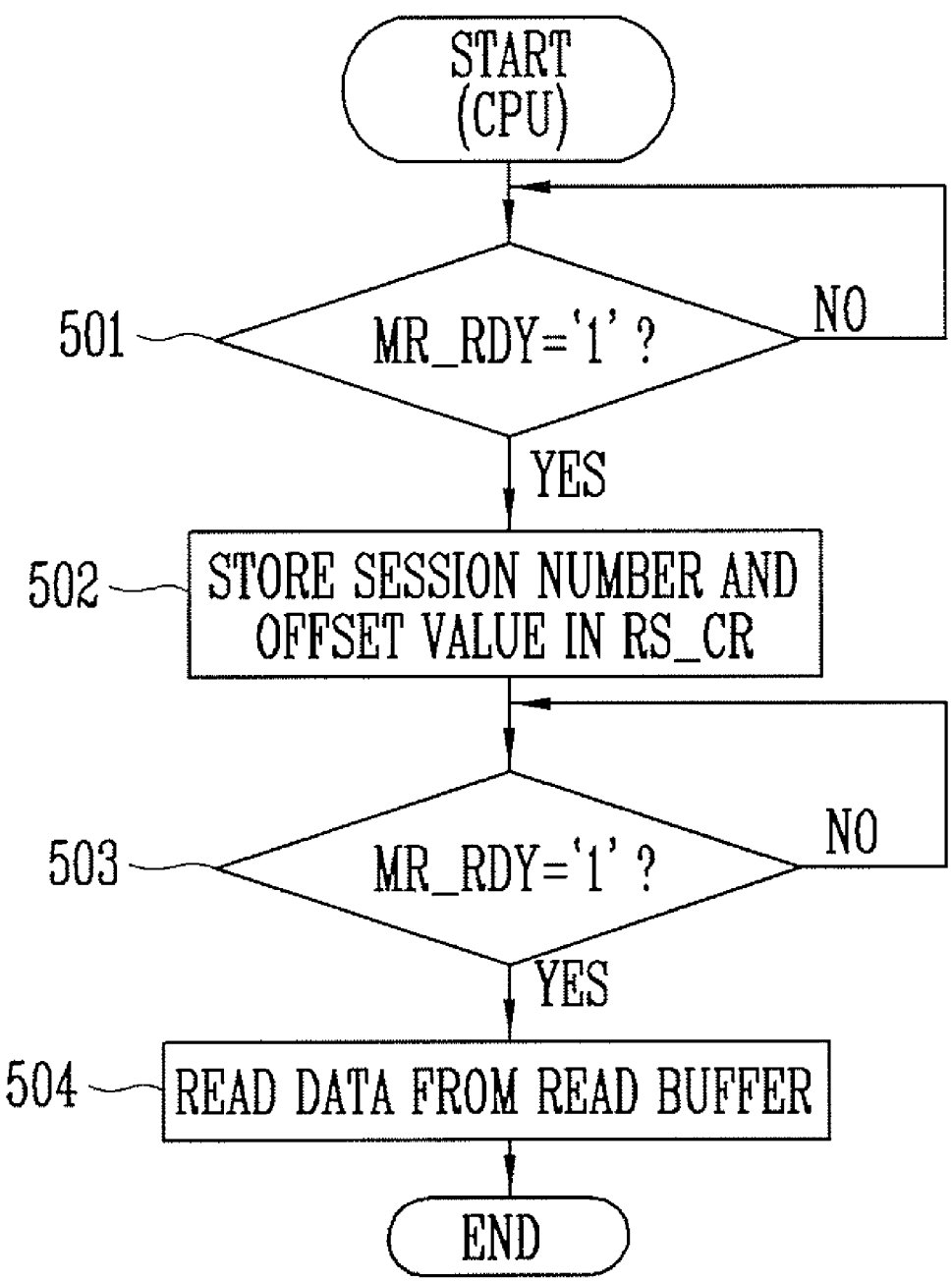

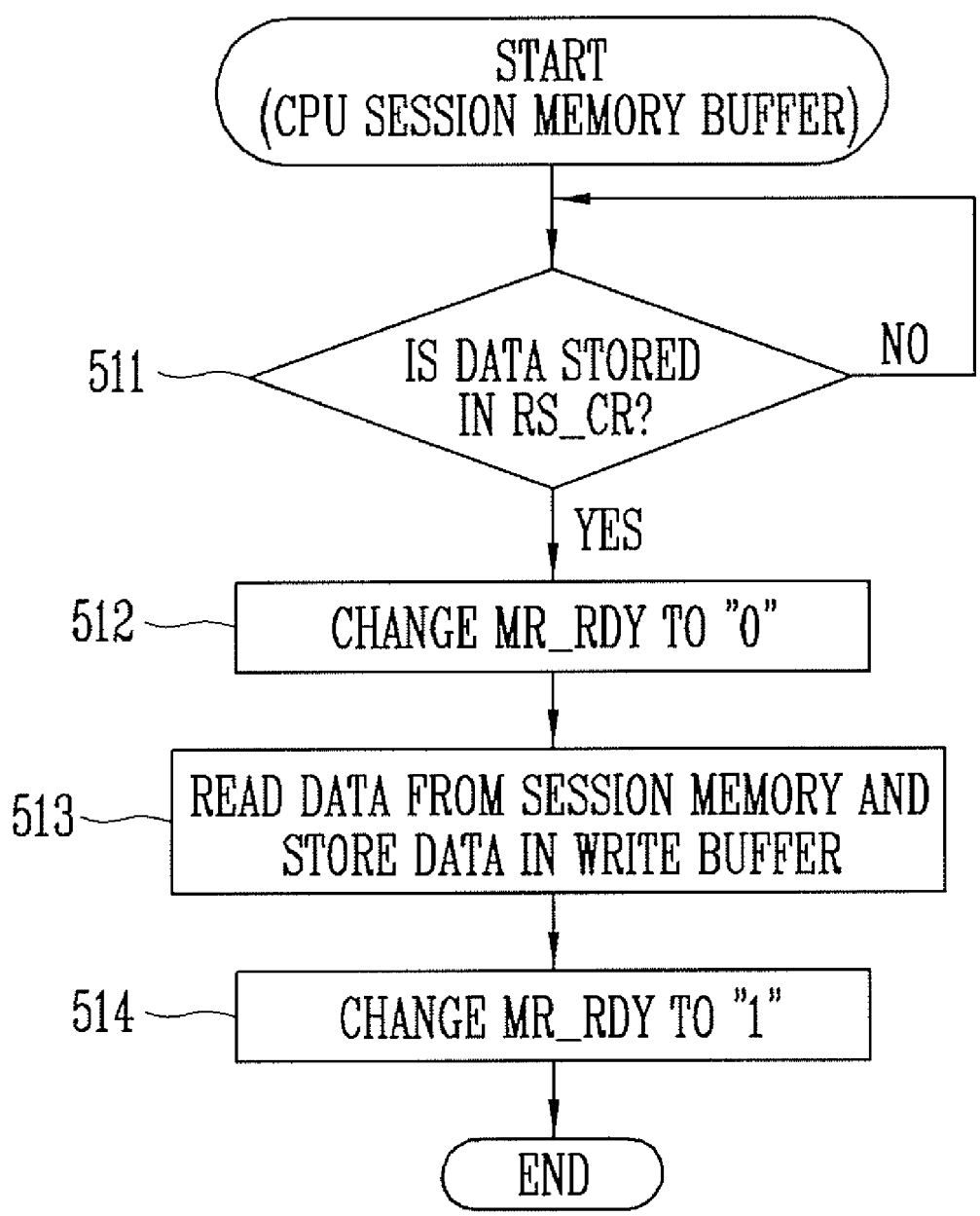

CRYPTOGRAPHIC DEVICE HAVING SESSION MEMORY BUS

CROSS-REFERENCE TO RELATED APPLICATION

This application claims priority to and the benefit of Korean Patent Application No. 2007-126551, filed Dec. 7, 2007, the disclosure of which is incorporated herein by reference in its entirety.

BACKGROUND

1. Field of the Invention

The present invention relates to a cryptographic device performing encryption or decryption on input data, and more particularly, to a cryptographic device having a session memory bus for communicating with a session memory.

2. Discussion of Related Art

Increases in information speed, communication speed, and Internet traffic has lead to sudden increases in processing speed and amounts of data, which has resulted in increases in requests for security service. As technology develops and cryptographic algorithms become more complicated, recently developed cryptographic devices increasingly use a dedicated cryptographic processor capable of processing a large amount of computation required for performing a complicated cryptographic algorithm. In addition, the cryptographic devices generally comprise a general-purpose processor, e.g., a Central Processing Unit (CPU), or a processor performing not only encryption/decryption functions but also other functions to support various requirements for an information security system.

FIG. 1 is a block diagram of a conventional cryptographic device.

Referring to FIG. 1, the conventional cryptographic device comprises a CPU 110, a session memory 130, a cryptographic processor 140 and an Input/Output (I/O) interface 150 connected via one common data bus. The right to use the data bus is managed by a Direct Memory Access (DMA) bus master 120.

The session memory 130 storing an encrypt key, a decrypt key, an Initial Vector (IV), Initial Data (ID), etc., is frequently accessed by the CPU 110 upon session initialization or close, and also is frequently accessed by the cryptographic processor 140 during an encryption or decryption process.

While the CPU 110 or the I/O interface 150 uses the data bus for an operation other than access to the session memory 130, the cryptographic processor 140 may frequently require access to the session memory 130 during an encryption or decryption process. In this case, although the session memory 130 is not accessed by a device, the cryptographic processor 140 cannot access the session memory 130 because only one device can use the common data bus. In other words, the cryptographic processor 140 can access the session memory 130 after the CPU 110 or the I/O interface 150 finishes its operation. Therefore, the overall performance of the conventional cryptographic device deteriorates due to delay time caused while the cryptographic processor 140 accesses the session memory 130.

SUMMARY OF THE INVENTION

The present invention is directed to providing a cryptographic device capable of reducing delay time taken for a cryptographic processor to access a session memory due to the occupation of a common data bus.

One aspect of the present invention provides a cryptographic device having a session memory bus, the cryptographic device comprising: an external session memory for storing cryptographic information on respective sessions; a cryptographic processor for encrypting or decrypting input data using the cryptographic information; an external session memory bus connected to the external session memory and the cryptographic processor; and a Central Processing Unit (CPU) for transferring and receiving data to and from the external session memory via the cryptographic processor. Here, the cryptographic processor comprises: an internal session memory for storing cryptographic information on the respective sessions; and an internal session memory bus connected to the internal session memory.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIGS. 4A and 4B are flowcharts showing a process of storing data in an internal session memory or an external session memory in a cryptographic device according to an exemplary embodiment of the present invention;

FIGS. 5A and 5B are flowcharts showing a process of reading data stored in an internal session memory or an external session memory in a cryptographic device according to an exemplary embodiment of the present invention.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
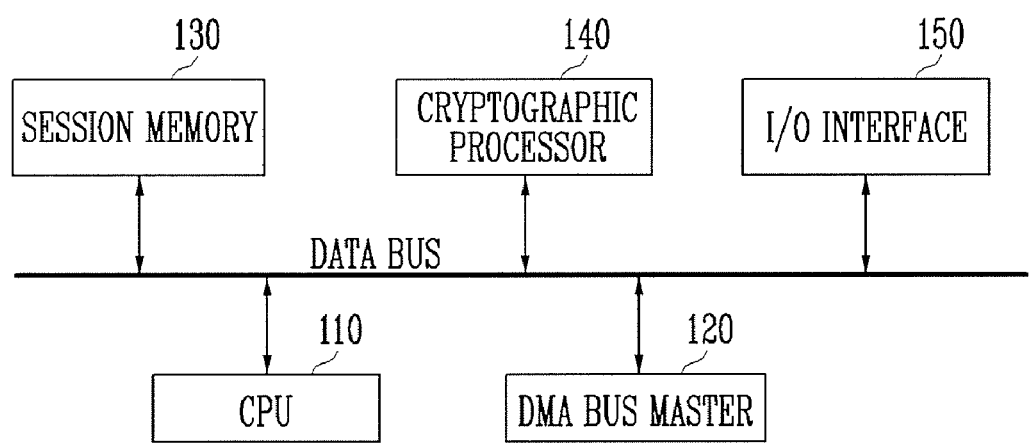
FIG. 1 is a block diagram of a conventional cryptographic device.
Figure 2:
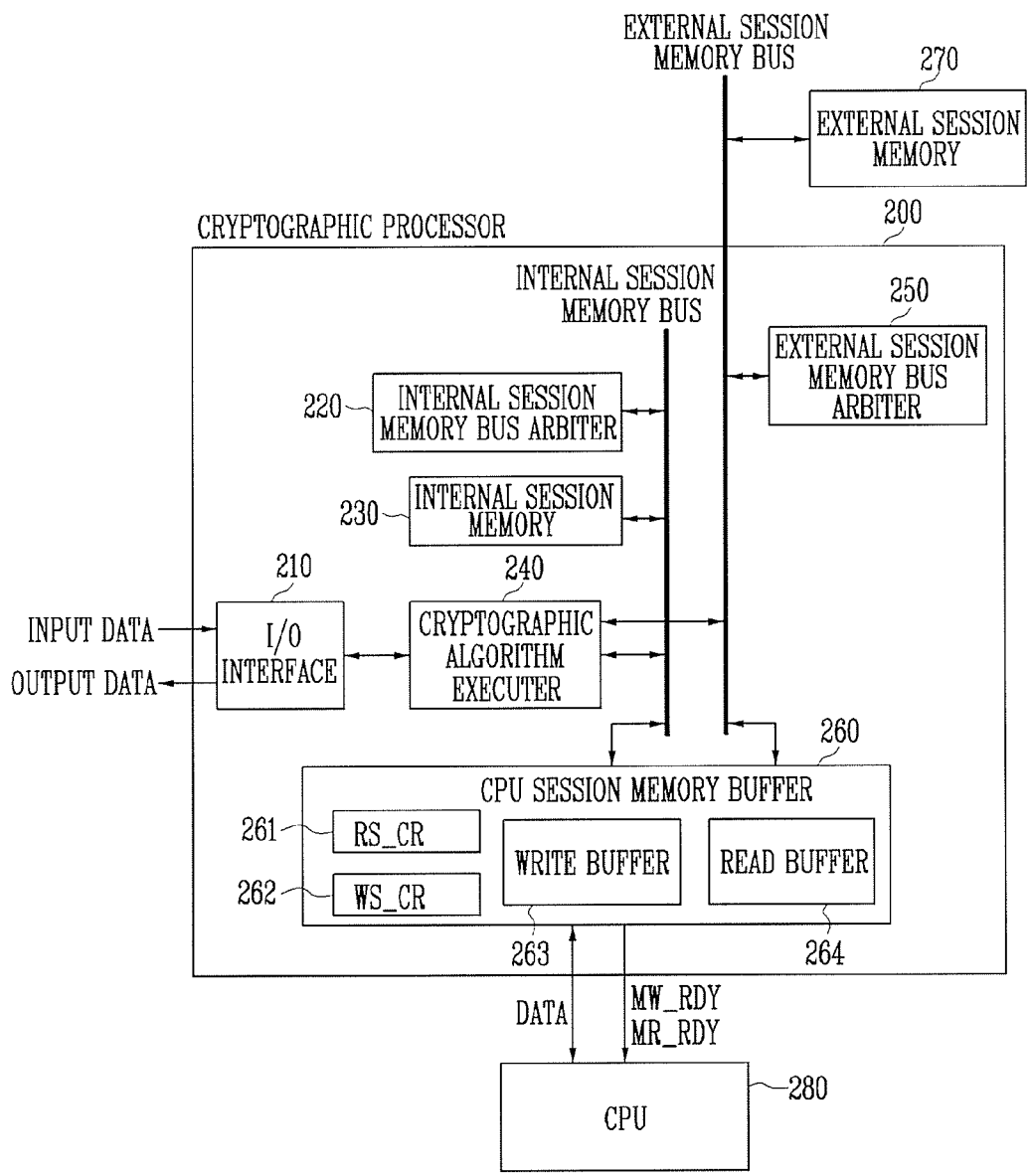
FIG. 2 is a block diagram of a cryptographic device according to an exemplary embodiment of the present invention.

FIG. 2 is a block diagram of a cryptographic device according to an exemplary embodiment of the present invention.

Referring to FIG. 2, the cryptographic device according to an exemplary embodiment of the present invention includes a cryptographic processor 200, an external session memory 270 and a Central Processing Unit (CPU) 280. Here, the external session memory 270 and an internal session memory 230 of the cryptographic processor 200 divide and store cryptographic information, e.g., an encrypt key, a decrypt key and an initial vector, on all sessions that can be processed by the cryptographic device. For example, when the cryptographic device processes sessions having session numbers 0 to T, the internal session memory 230 stores cryptographic information on sessions having session numbers 0 to N, and the external session memory 270 stores cryptographic information on sessions having session numbers (N+1) to T.

The external session memory 270 transfers and receives data via only an external session memory bus between the external session memory 270 and the cryptographic processor 200, but is not connected with a common data bus. Therefore, the CPU 280 can perform data communication with the external session memory 270 via the cryptographic processor 200.

The cryptographic processor 200 includes an Input/Output (I/O) interface 210, an internal session memory bus arbiter 220, the internal session memory 230, a cryptographic algorithm executer 240, an external session memory bus arbiter 250 and a CPU session memory buffer 260. In addition, the internal session memory 230 is connected with the internal session memory bus arbiter 220, the cryptographic algorithm executer 240 and the CPU session memory buffer 260 via an internal session memory bus, and the external session memory 270 is connected with the external session memory bus arbiter 250, the cryptographic algorithm executer 240 and the CPU session memory buffer 260 via the external session memory bus.

The internal session memory bus arbiter 220 and the external session memory bus arbiter 250 receive requests, i.e., Bus Requests (BRs), of the cryptographic algorithm executer 240 and the CPU session memory buffer 260 to use the internal session memory bus and the external session memory bus, and allocate the internal session memory bus and the external session memory bus according to priority, respectively. Operation of the internal session memory bus arbiter 220 and the external session memory bus arbiter 250 will be described in detail with reference to FIG. 6.

The cryptographic algorithm executer 240 reads cryptographic information on the corresponding session stored in the internal session memory 230 or the external session memory 270 according to header information of data input via the I/O interface 210, and encrypts or decrypts the input data using the cryptographic information. In an exemplary embodiment, header information of input data may include a session number. In addition, the I/O interface 210 may input or output data in connection with the common data bus of the cryptographic device.

Here, the cryptographic algorithm executer 240 may transfer a BR to the internal session memory bus arbiter 220 or the external session memory bus arbiter 250 to access the internal session memory 230 or the external session memory 270, be allocated the internal session memory bus or the external session memory bus by the internal session memory bus arbiter 220 or the external session memory bus arbiter 250, and then access the internal session memory 230 or the external session memory 270 to perform the above mentioned operation. Before reading or writing data from or in the internal session memory bus arbiter 220 or the external session memory bus arbiter 250, the CPU session memory buffer 260 to be described below also must perform the BR process and the bus allocation process in communication with the internal session memory bus arbiter 220 or the external session memory bus arbiter 250.

Meanwhile, when an initial vector value is changed during an encryption or decryption process, the cryptographic algorithm executer 240 stores the updated initial vector value in the corresponding position in the internal session memory 230 or the external session memory 270. When the encryption or decryption process is finished, the cryptographic algorithm executer 240 outputs result data via the I/O interface 210.

The CPU session memory buffer 260 is used for transferring data between the internal/external session memories 230 and 270 and the CPU 280. The CPU session memory buffer 260 includes a Read-Start Control Register (RS_CR) 261, a Write-Start Control Register (WS_CR) 262, a write buffer 263 and a read buffer 264.

To read or store data from or in the internal session memory 230 or the external session memory 270, the CPU 280 may store a session number and an offset number in the RS_CR 261 or the WS_CR 262. Then, the CPU session memory buffer 260 recognizes the values stored in the RS_CR 261 or the WS_CR 262 and thereby may read the corresponding data from the internal session memory 230 or the external session memory 270 and store the data in the read buffer 264 or may store data stored in the write buffer 263 by the CPU 280 in the corresponding position in the internal session memory 230 or the external session memory 270. Here, the CPU session memory buffer 260 may perform communication for a reading or writing operation with the CPU 280 using a Memory-Write Ready (MW_RDY) signal and a Memory-Read Ready (MR_RDY) signal. A process of inputting and outputting data between the CPU session memory buffer 260 and the CPU 280 will be described in detail with reference to FIGS. 4A to 5B.

In the above described structure, the cryptographic processor can rapidly access a session memory during an encryption or decryption process regardless of another device, and can transfer data between the internal/external session memory and the CPU through the CPU session memory buffer. In addition, since the internal session memory and the external session memory each are connected to respective buses, one component of the cryptographic processor can access the internal session memory while another component accesses the external session memory.

Figure 3:
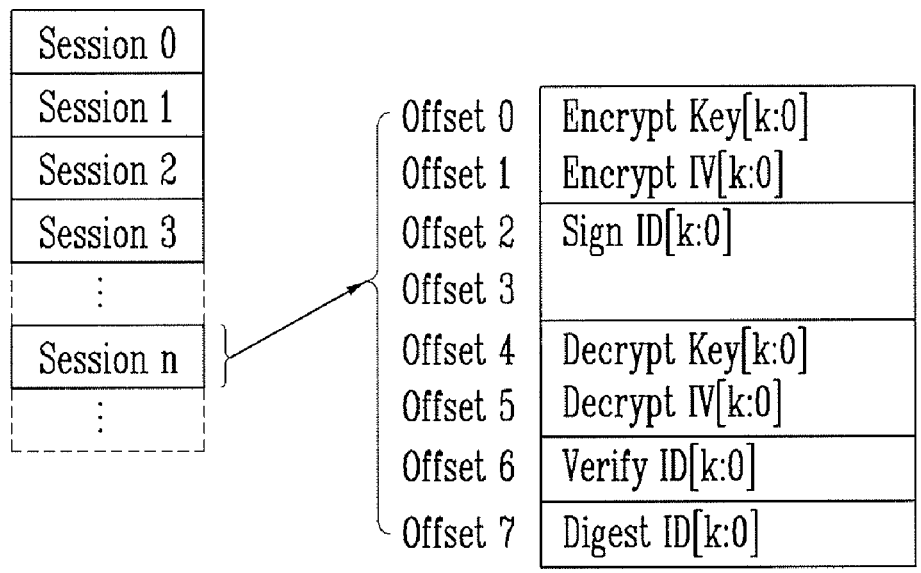
FIG. 3 illustrates data structures of an internal session memory and an external session memory included in a cryptographic device according to an exemplary embodiment of the present invention.

FIG. 3 illustrates data structures of an internal session memory and an external session memory included in a cryptographic device according to an exemplary embodiment of the present invention.

Referring to FIG. 3, an internal session memory and an external session memory may store cryptographic information, such as an encrypt key/initial vector, a decrypt key/initial vector, initial data for sign (Sign ID), initial data for verification (Verify ID), initial data for digest (Digest ID), etc., on one session according to a session number, and the data is stored in the session number according to offset values. Thus, using a session number and an offset value, a CPU can read desired data from the internal session memory or the external session memory or store specific data from the internal session memory or the external session memory.

Figure 4A:
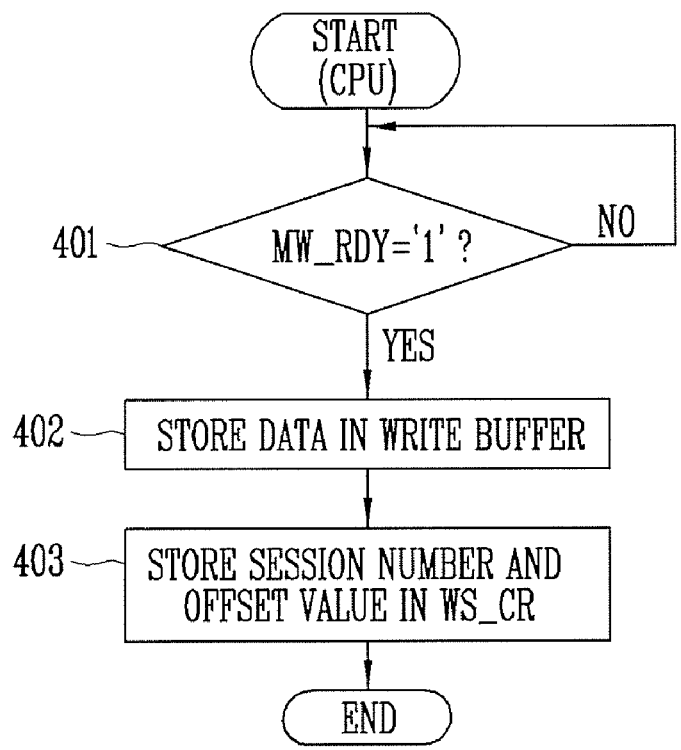

FIGS. 4A and 4B are flowcharts showing a process of storing data in an internal session memory or an external session memory in a cryptographic device according to an exemplary embodiment of the present invention.

Referring to FIG. 4A, to store data in an internal session memory or an external session memory, a CPU first checks whether an MW_RDY signal is "1" (step 401), and waits until the MW_RDY signal becomes "1" when the MW_RDY signal is "0".

When the MW_RDY signal becomes "1", the CPU stores data to be stored in the internal session memory or the external session memory in a write buffer (step 402). When the storage is finished, the CPU stores a session number and an offset value in a WS_CR to designate a position in the internal session memory or the external session memory that will store the data (step 403).

Referring to FIG. 4B, a CPU session memory buffer checks whether or not data, i.e., a session number and an offset value, is recorded in the WS_CR (step 411). When it is checked that data is recorded in the WS_CR, the CPU session memory buffer changes the MW_RDY signal to "0" to prevent the CPU from overwriting another data in the write buffer.

Subsequently, the CPU session memory buffer stores the data stored in the write buffer in the internal session memory or the external session memory using the session number and the offset value stored in the WS_CR (step 413). When the storage is finished, the CPU session memory buffer changes back the MW_RDY signal to "1" to indicate that it is possible to perform another write operation (step 414).

FIGS. 5A and 5B are flowcharts showing a process of reading data stored in an internal session memory or an external session memory in a cryptographic device according to an exemplary embodiment of the present invention.

Referring to FIG. 5A, a CPU first checks whether an MR_RDY signal is "1" to read data stored in an internal session memory or an external session memory (step 501). When the MW_RDY signal is "0", the CPU waits until the MW_RDY signal becomes "1". When the MW_RDY signal becomes "1", the CPU stores a session number and an offset value in an RS_CR to designate a position of data to read (step 502).

The MW_RDY signal becomes "1" while a CPU session memory buffer reads the data from the internal session memory or the external session memory and writes the data in a write buffer. Thus, the CPU determines whether or not the MR_RDY signal is changed back to "1" in order to determine whether or not the operation of writing data in the write buffer has been finished (step 503). When the MR_RDY signal is changed to "1", the CPU reads the data from the write buffer (step 504).

Referring to FIG. 5B, the CPU session memory buffer checks whether or not data, i.e., a session number and an offset value, is recorded in the RS_CR (step 511). When it is checked that data is recorded in the RS_CR, the CPU session memory buffer changes the MR_RDY signal to "0" to inform the CPU that data is being written in the write buffer (step 512).

Subsequently, using the session number and the offset value stored in the RS_CR, the CPU session memory buffer reads the data of the corresponding address in the internal session memory or the external session memory and stores the data in the write buffer (step 513). When the storage is finished, the CPU session memory buffer changes the MR_RDY signal back to "1" to indicate that it is possible to perform another read operation (step 514).

Figure 6:
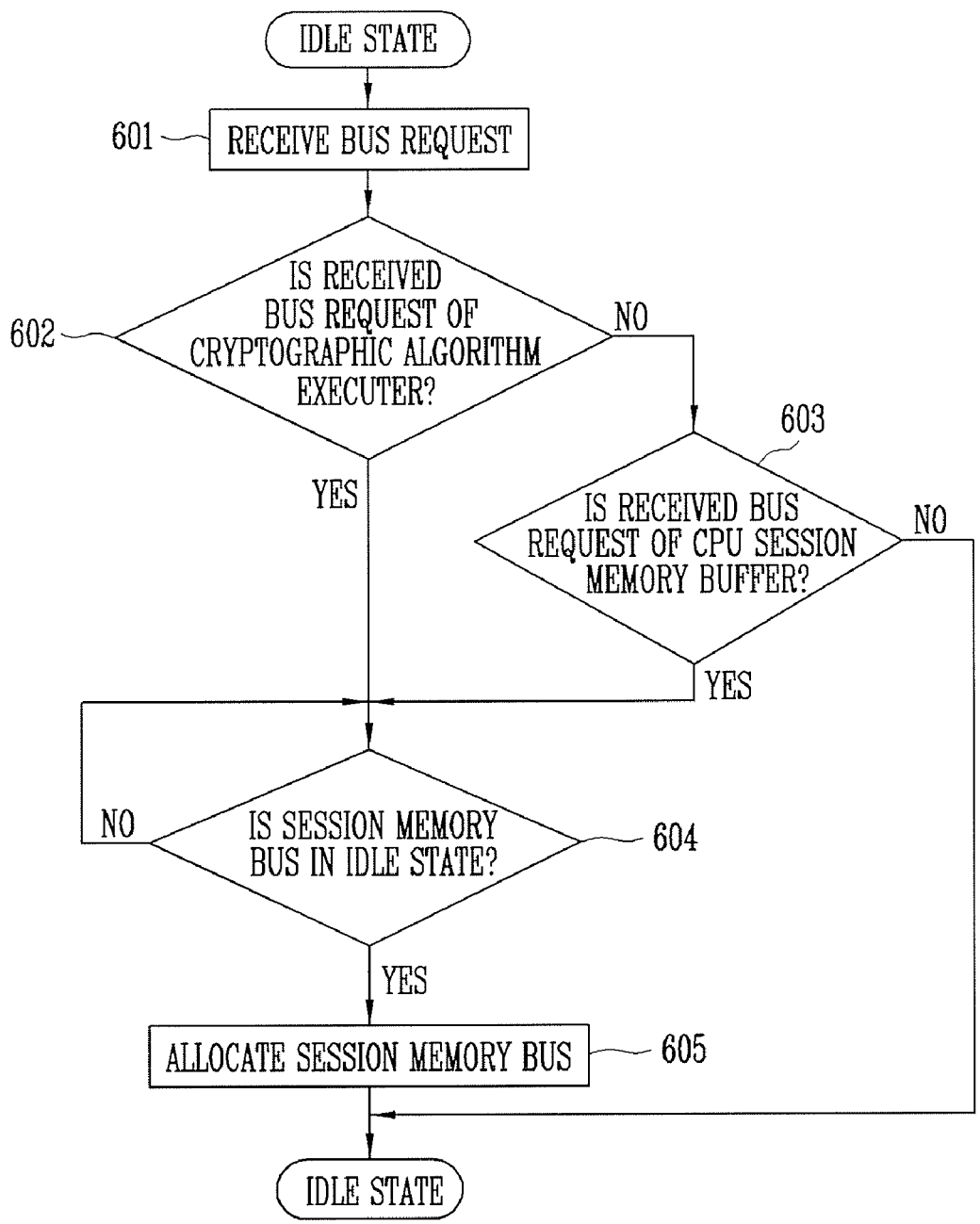
FIG. 6 is a flowchart showing operation of an internal session memory bus arbiter and an external session memory bus arbiter included in a cryptographic device according to an exemplary embodiment of the present invention.

FIG. 6 is a flowchart showing operation of an internal session memory bus arbiter and an external session memory bus arbiter included in a cryptographic device according to an exemplary embodiment of the present invention.

To rapidly perform encryption or decryption in a cryptographic device according to an exemplary embodiment of the present invention, a BR of a cryptographic algorithm executer and a BR of a CPU session memory buffer may have priorities in sequence. The flowchart described below is based on such priorities, and priorities between BRs may vary according to implementation. In addition, a session memory bus arbiter described below indicates an internal session memory bus arbiter or an external session memory bus arbiter. A session memory bus related to the internal session memory bus arbiter indicates an internal session memory bus, and a session memory bus related to the external session memory bus arbiter indicates an external session memory bus.

Referring to FIG. 6, when a session memory bus arbiter receives at least one BR in its idle state (step 601), it determines in sequence whether the received BR is a BR of a cryptographic algorithm executer and a BR of a CPU session memory buffer (steps 602 and 603). When the received BR is one of BRs of a cryptographic algorithm executer and a CPU session memory buffer, the process proceeds to step 604 without performing determination on a next BR. When it is determined in steps 602 and 603 that the received BR is not one of BRs of a cryptographic algorithm executer and a CPU session memory buffer, the session memory bus arbiter returns to the idle state because the BR is incorrect.

When it is determined that the received BR is one of the BRs of a cryptographic algorithm executer and a CPU session memory buffer, the session memory bus arbiter determines whether a session memory bus is currently in its idle state (step 604). When the session memory bus is not in the idle state, the session memory bus arbiter waits until the session memory bus switches to the idle state.

When the session memory bus switches to the idle state, the session memory bus arbiter allocates the session memory bus to the cryptographic algorithm executer or the CPU session memory buffer that has transferred the BR determined in steps 602 and 603 (step 605), and returns to the idle state. Through this process, the session memory bus arbiter can process a BR according to priority.

As described above, the present invention allows a cryptographic processor to access a session memory via a session memory bus without being disturbed by another device.

In addition, the present invention divides and stores cryptographic information in an external session memory and an internal session memory and allows the external session memory and the internal session memory to be connected via respective buses such that components of a cryptographic processor can rapidly and efficiently access the external session memory and the internal session memory.

Furthermore, the present invention provides a CPU session memory buffer for data communication between a session memory and a CPU and thereby can support data communication between the CPU and the session memory even in a cryptographic device having a structure in which the session memory is not connected to a common data bus.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A cryptographic device having a session memory bus, comprising:
    an external session memory for storing cryptographic information on respective sessions;
    a cryptographic processor for encrypting or decrypting input data using the cryptographic information;
    an external session memory bus connected to the external session memory and the cryptographic processor; and
    a Central Processing Unit (CPU) for transferring and receiving data to and from the external session memory via the cryptographic processor,
    wherein the cryptographic processor comprises:
    an internal session memory for storing cryptographic information on the respective sessions; and
    an internal session memory bus connected to the internal session memory,
    wherein the cryptographic processor comprises:
        an Input/Output (I/O) interface for receiving the input data from the outside of the cryptographic processor and outputting encrypted or decrypted data;
        a cryptographic algorithm executer for encrypting or decrypting the input data using cryptographic information of a current session stored in the external session memory or the internal session memory;

a CPU session memory buffer for receiving data from the CPU to transfer the data to the external session memory or the internal session memory, and transferring data of the external session memory or the internal session memory to the CPU;

an external session memory bus arbiter for receiving a bus request from the cryptographic algorithm executer or the CPU session memory buffer, and allocating the external session memory bus according to the bus request; and an internal session memory bus arbiter for receiving a bus request from the cryptographic algorithm executer or the CPU session memory buffer, and allocating the internal session memory bus according to the bus request.

2. The cryptographic device of claim 1, wherein the external session memory transfers and receives data via only the external session memory bus.

3. The cryptographic device of claim 1, wherein the external session memory and the internal session memory divide and store the cryptographic information on each session.

4. The cryptographic device of claim 1, wherein the cryptographic algorithm executer stores an initial vector changed during an encryption process or a decryption process in the internal session memory or the external session memory.

5. The cryptographic device of claim 1, wherein the external session memory bus arbiter and the internal session memory bus arbiter allocate the external session memory bus or the internal session memory bus to the cryptographic algorithm executer and then the CPU session memory buffer according to priority.

6. The cryptographic device of claim 1, wherein the cryptographic information includes an encrypt key, a decrypt key, an initial vector, initial data for sign, initial data for verification, and initial data for digest.

7. The cryptographic device of claim 1, wherein the CPU session memory buffer comprises:

a read-start control register for storing a session number and an offset value indicating a position of the data in the external session memory or the internal session memory read by the CPU;

a write-start control register for storing a session number and an offset value indicating a position in the external session memory or the internal session memory in which the CPU stores data;

a read buffer for storing data read from the external session memory or the internal session memory by the CPU; and a write buffer for storing data stored in the external session memory or the internal session memory by the CPU.

8. The cryptographic device of claim 7, wherein the CPU session memory buffer checks whether or not the CPU has recorded the session number and the offset value in the read-start control register and store in the write buffer the data read by the CPU from the external session memory or the internal session memory.

9. The cryptographic device of claim 8, wherein the CPU session memory buffer transfers a memory-read ready signal indicating whether or not a read operation can be performed to the CPU.

10. The cryptographic device of claim 9, wherein the CPU receives the data stored in the read buffer according to the memory-read ready signal.

11. The cryptographic device of claim 7, wherein the CPU session memory buffer checks whether or not the CPU has recorded the session number and the offset value in the write-start control register and store the data stored in the write buffer in the external session memory or the internal session memory.

12. The cryptographic device of claim 11, wherein the CPU session memory buffer transfers a memory-write ready signal indicating whether or not a write operation can be performed to the CPU.

13. The cryptographic device of claim 12, wherein the CPU stores in the write buffer the data to be stored in the external session memory or the internal session memory by the CPU according to the memory-write ready signal.

* * * * *